`US 8,069,147 B2`

(12) United States Patent
Blazejewski et al.

(10) Patent No.: US 8,069,147 B2
(45) Date of Patent: Nov. 29, 2011

(54) SYSTEM AND METHOD FOR DELIVERING RESULTS OF A SEARCH QUERY IN AN INFORMATION MANAGEMENT SYSTEM

(75) Inventors: Edward Blazejewski, Yardley, PA (US); Thomas Angle, Newton, PA (US)

(73) Assignee: Computer Associates Think, Inc., Islandia, NY (US)

( * ) Notice: Subject to any disclaimer, the term of this patent is extended or adjusted under 35 U.S.C. 154(b) by 215 days.

(21) Appl. No.: 11/559,225

(22) Filed: Nov. 13, 2006

(65) Prior Publication Data

US 2007/0136345 A1 Jun. 14, 2007

Related U.S. Application Data

(60) Provisional application No. 60/735,216, filed on Nov. 10, 2005.

(51) Int. Cl.
*G06F 7/00* (2006.01)
(52) U.S. Cl. .............. 707/640; 707/783; 707/999.204; 715/212
(58) Field of Classification Search ................. None
See application file for complete search history.

(56) References Cited

U.S. PATENT DOCUMENTS

| | | | | |
|---|---|---|---|---|
| 5,423,033 A * | 6/1995 | Yuen ................................ 707/4 |
| 5,497,491 A * | 3/1996 | Mitchell et al. ................ 719/315 |
| 5,832,496 A * | 11/1998 | Anand et al. .................. 707/102 |
| 6,094,684 A * | 7/2000 | Pallmann ...................... 709/227 |
| 6,243,081 B1 * | 6/2001 | Goris et al. ................... 345/555 |
| 6,378,073 B1 * | 4/2002 | Davis et al. ....................... 726/1 |
| 6,415,280 B1 * | 7/2002 | Farber et al. ................. 707/698 |
| 6,947,944 B1 * | 9/2005 | Furuike ............................... 1/1 |
| 6,950,833 B2 * | 9/2005 | Costello et al. ..................... 1/1 |
| 6,973,618 B2 * | 12/2005 | Shaughnessy et al. ........ 715/239 |
| 7,181,478 B1 * | 2/2007 | Korson et al. ................ 707/667 |
| 7,185,279 B2 * | 2/2007 | Machalek ..................... 715/209 |
| 7,330,997 B1 * | 2/2008 | Odom ......................... 714/6.23 |
| 7,346,883 B2 * | 3/2008 | Keck et al. ..................... 716/19 |
| 7,546,312 B1 * | 6/2009 | Xu et al. .................. 707/103 R |
| 2002/0083079 A1 * | 6/2002 | Meier et al. ................ 707/104.1 |
| 2002/0152305 A1 | 10/2002 | Jackson et al. ............... 709/224 |
| 2003/0037302 A1 * | 2/2003 | Dzienis ........................ 715/523 |
| 2003/0131312 A1 * | 7/2003 | Dang ............................ 715/500 |
| 2003/0226104 A1 | 12/2003 | Blazejewski et al. ....... 715/501.1 |
| 2004/0117358 A1 | 6/2004 | Von Kaenel et al. ............. 707/3 |
| 2004/0223197 A1 * | 11/2004 | Ohta et al. ................... 358/538 |

(Continued)

FOREIGN PATENT DOCUMENTS
WO WO 02/35382 * 2/2002

*Primary Examiner* — Wilson Lee
*Assistant Examiner* — Jessica N Le
(74) *Attorney, Agent, or Firm* — Pillsbury Winthrop Shaw Pittman LLP

(57) ABSTRACT

A system and method for managing data repositories may include providing techniques for end users to access and manipulate reports stored in the repositories. Text-based, image-based, or other types of reports may be stored in online and/or offline repositories, and in response to a search request, reports stored in the online and/or offline repositories may be retrieved. End users may export report data from text-based and/or image-based formats by converting the data into a spreadsheet format using various customization techniques. Thus, end users may edit, modify, analyze, or otherwise manipulate information in online and/or offline reports, while maintaining integrity of the information in the repositories.

36 Claims, 5 Drawing Sheets

U.S. PATENT DOCUMENTS

| | | | |
|---|---|---|---|
| 2004/0230700 A1* | 11/2004 | Oomori | 709/247 |
| 2005/0080803 A1* | 4/2005 | Sauermann | 707/101 |
| 2005/0165735 A1* | 7/2005 | Lin et al. | 707/2 |
| 2006/0004693 A1* | 1/2006 | Ramanathan et al. | 707/2 |
| 2006/0005127 A1* | 1/2006 | Ferguson et al. | 715/522 |
| 2006/0039610 A1* | 2/2006 | Cantral | 382/190 |
| 2006/0174192 A1* | 8/2006 | Mortensen | 715/513 |
| 2006/0253486 A1* | 11/2006 | Ford | 707/102 |
| 2007/0011142 A1* | 1/2007 | Sattler et al. | 707/3 |
| 2007/0016459 A1* | 1/2007 | King et al. | 705/8 |
| 2007/0033578 A1* | 2/2007 | Arnold et al. | 717/130 |
| 2007/0043689 A1* | 2/2007 | So | 707/1 |

* cited by examiner

FIG. 3

| Action | ReportID | Creation Date | Creation Time | Description |
|---|---|---|---|---|
| Go | $-ANNOTEST-01 | 08/24/2004 | 14:35:31 | REPORT FOR ANNOTATION TESTING |
| Go | $-ANNOTEST-02 | 04/07/2005 | 12:54:07 | REPORT FOR ANNOTATION TEST |
| Go | $-LOGVIEW-01 | 06/22/2005 | 10:10:18 | REPORT FOR LOGICAL VIEW TES |
| Go | AA-SERIES-REPORT-001-GENERAL-RPT | 09/21/2004 | 07:20:17 | 40 CHARACTER DESCRIPTION END |
| Go | BAR1 | 04/19/2005 | 12:25:44 | |
| Go | BAR2 | 04/19/2005 | 12:25:04 | |
| Go | BB-SERIES-REPORT-002-GENERAL-RPT | 09/21/2004 | 07:20:19 | |
| Go | CC-SERIES-REPORT-003-GENERAL-RPT | 09/21/2004 | 07:20:21 | |
| Go | CHARRPT3 | 04/13/2005 | 12:15:06 | TEST REPORT FOR CHARACTER T |
| Go | COND1 | 04/19/2005 | 12:24:25 | |

Folder filter settings

1. Date Criteria
Report Creation Date:
From [30] day(s) ago through today.
Or From [ ] - [ ] - [ ] (MM-DD-YYYY)
To [ ] - [ ] - [ ] (MM-DD-YYYY)

2. Report Criteria
Report ID:
Mode:
Dist ID:
☐ On-line reports only

Folder Name: View r11 (VIEW11DB)
Reports 1 - 10 of 33 > >>

Report List (Most current version)

Actions:
Browse
Browse
Information
Annotations List
Logical View
Browse in new window
Print
Email
Save
Export
More versions
Reset status

|   | A | B | C | D | E | F |
|---|---|---|---|---|---|---|
| 1 | Name | Address | | Phone | Y T D SALES 95 | Department |
| 2 | **** | ******** | | ***** | ************ | *********** |
| 3 | Allen Edwards Salon | 15760 Ventura Blvd, | Encino | (818) 981-7711 | $10,037,874.00 | 46-89 |
| 4 | Alliance of Motion Pic | 14144 Ventura Blvd, | Sherman Oaks | (818) 995-3600 | $1,873,330.00 | |
| 5 | Alikay Electronics Inc | 9732 Variel Avenue, | Chatsworth | (818) 998-6771 | $54,555,307.00 | |
| 6 | Alpen T.V. | 10243 Sepulveda, | Mission Hills | (818) 893-1814 | $18,982,220.00 | |
| 7 | Alta Molda Salon | 18342 Ventura Blvd, | Tarzana | (818) 708-1701 | $1,500,200.00 | |
| 8 | Alza Jewelers | 15301 Ventura Blvd, | Sherman Oaks | (818) 986-9800 | $2,000,088.00 | |
| 9 | Amalgamated Talents Inc | 7252 Bellaire, | No. Hollywood | (818) 982-2433 | $180,320,000.00 | |
| 10 | Amber's Chicken Kitchen | 10367 Balboa Blvd, | Granada Hills | (818) 366-1888 | $2,900,198.00 | |

SYSTEM AND METHOD FOR DELIVERING RESULTS OF A SEARCH QUERY IN AN INFORMATION MANAGEMENT SYSTEM

CROSS-REFERENCE TO RELATED APPLICATIONS

This application claims the benefit of provisional U.S. Patent Application Ser. No. 60/735,216, entitled "Information Management System," filed Nov. 10, 2005, which is hereby incorporated by reference in its entirety.

FIELD OF THE INVENTION

The present invention relates to systems and methods for managing information in data repositories, and in particular, to delivering results of search queries for end users to manipulate the information in the data repositories.

BACKGROUND OF THE INVENTION

In the modern business environment, large amounts of data, documents, and other information are often stored in data repositories. This information typically represents important business assets, and therefore must be secured, retained, and controlled in accordance with departmental, corporate, government, or other types of guidelines and regulations. For businesses or enterprises to succeed, mission-critical information must be easily and quickly accessible, in addition to being provided to end users in a way that maximizes productivity. However, the requisite security, retention, and control goals often prevent efficient and accurate management and distribution of information, which can be costly and damaging. In particular, by not providing the right information to the right people in a timely, effective, and meaningful way, security may be compromised, downtime may result, and resources may be unnecessarily wasted.

Likewise, an important enterprise objective is turning data into usable information. However, existing storage structures and schemas are not conducive to meeting potentially wide variations in the needs of end-users. For example, many enterprises are broken into separate departments, where end-users in a first department may wish to view data in one format, while users in a second department may wish to view the same data in an entirely different format. Furthermore, some data may be stored online (e.g., a live, active repository), while other data may be stored offline (e.g., a tape backup or other long-term repository), yet efficient operation of a business may depend on having both online and offline repositories accessible. However, existing systems are unable to effectively bridge the gap between managing data that resides in repositories and delivering information to end users in a secure, timely, and customizable fashion.

Therefore, existing systems lack mechanisms for distributing, viewing, and managing online and offline data throughout an enterprise. Existing systems also lack mechanisms for allowing users with varying needs to manipulate data in customizable ways, while preserving the integrity of the underlying data. Existing systems suffer from these and other problems.

SUMMARY OF THE INVENTION

According to various embodiments of the invention, a system and method for managing information in data repositories may address the drawbacks of existing systems by providing techniques for delivering results of search queries for end users to manipulate the information in the data repositories. A search query may request one or more reports matching predetermined criteria, user-provided criteria, or combinations thereof from online and/or offline data repositories. The search query may be executed by identifying reports in the online and/or offline data repositories, and the identified reports matching the search query may be returned to a user in a customized or customizable form.

In some embodiments of the invention, a data management system may deliver results of search queries to end users. The data management system may include, among other things, an application server having a data management application resident thereon, where the data management application may perform one or more functions related to searching one or more data repositories to deliver formattable results of a search query to end users. In one implementation, the data repositories may include online data repositories and/or offline data repositories. When results matching the search query are identified, the results may be communicated to the data management application, and a user may view, export, and otherwise manipulate the results without disturbing versions of the results stored in the data repositories. Data or other information resident in the data repositories may include, for example and among other things, reports such as revenue reports, sales reports, banking transactions, or other types of reports, as well as data that can be compiled into customized and/or customizable reports by the data management application or another application.

In some embodiments of the invention, when one or more reports are identified that match the search query in the online data repositories, the online reports may be delivered to a user that submitted the search query. When one or more reports are identified that match the search query in the offline data repositories, the offline reports may be requested from offline storage devices, retrieved and/or decompressed (if necessary), and delivered to the user that submitted the search query. In another implementation, the offline data repositories may include safeguards to ensure that the user wants to review the offline data, and the user may be prompted to confirm that the user wants to proceed with retrieving offline data. Upon confirmation, a request may be sent to the offline data repositories, which may then respond to the request by unarchiving, decompressing, or otherwise making the offline data available.

In some embodiments of the invention, a data management application may present reports matching a search query to end users in a desired format, while allowing the end users to manipulate the reports without editing, overwriting, corrupting, disturbing, or otherwise modifying the reports as they reside in the data repositories. In some implementations, the data management application may provide a web-based interface that extends functionality and features of mainframe repositories, thereby enabling users to make optimal, productive use of reports with minimal maintenance or training. For example, users may submit a search query via the data management application, one or more text-based reports matching the search query may be retrieved from one or more data repositories, and the data application may allow the users to export the matching reports in a familiar format (e.g., to a spreadsheet application residing on a local machine).

In some embodiments of the invention, the data management application may include a report filter utility. The report filter utility may provide functions and features for searching for reports, tracking user activity using audit logging, varying a presentation of read versus unread reports, providing statistical analysis, making multiple versions of a report available, intelligently displaying report lists, and/or performing other functions. The data management application may be further configured to provide administrators, or similar types of users, with control over various features, such as enhancing scalability with a dynamic thread pool, specifying default filters, threshold dates, maximum/minimum date ranges, or other system settings.

In some embodiments of the invention, users may specify various filtering criteria to limit or target a search for reports. The filtering criteria may include a date criteria, a report criteria, or other criteria. An administrator may specify whether one or more of the date criteria, report criteria, or other criteria are mandatory, optional, or some combination thereof. Moreover, users may provide wildcards, truncation variables, or other information useful to formulating a search query. For example, a search for reports may be filtered according to a date or date range, a report identifier (including wildcards, truncation variables, etc.), view mode, a distribution list, online or offline repositories, or other criteria.

In some embodiments of the invention, the data management application may include a report list viewer, which displays a list of reports identified in the data repositories as matching the search query. The report list viewer may be displayed in a graphical user interface, and may include columns displaying available actions, identifiers, creation dates, creation times, descriptions, or other information for each report. In some implementations, one or more of the columns may be sortable (i.e., a user may click on a column header to sort the report list according to criteria in the column). The reports shown in report list viewer may be limited to current versions of each report, thereby limiting a number of search query results, and a user may request display of older versions of a report. In some implementations, the report list viewer may be displayed in the graphical user interface together with the report filter utility, such that a user may provide additional filtering criteria to the report list. The available actions may allow a user to quickly take action on a report, such as browsing a report, viewing annotations associated with a report, emailing the report, exporting the report, or other actions. An appearance of one or more available actions may be varied to indicate which actions have been previously taken or when an action is unavailable for a particular report and the appearance may be reset when a user selects an option to set indicator statuses.

In some embodiments of the invention, the data management application may include an export preview viewer, which may display a set of fields for configuring an export operation. The export preview viewer may be displayed when a user selects an export option for a selected report, and may include options for reconfiguring or reformatting a report so as to be easily accessible for review and analysis. In particular, a text-based report may be persistently stored in online and/or offline data repositories, and by selecting the export option, the text-based report may be exported for a user to manipulate and analyze, thereby protecting an original version of the text-based report in the data repositories. Moreover, the export option may provide options for configuring the export operation, such that a user may make optimal productive use of information in the text-based report by customizing the information therein to a form useable within a spreadsheet application, where the user can manipulate the information and customize an organization of the information.

In some embodiments of the invention, when the selected report is an online report, the export preview viewer may be displayed without any further user action. When the selected report is an offline report, a user may be prompted to provide a confirmation that the offline report is to be recalled from offline storage before displaying the export preview viewer. After a selected report has been retrieved (from online and/or offline data repositories), the export preview viewer may be displayed, providing one or more options for configuring a process of exporting a text-based report to a spreadsheet application. When a report is in an image format, the image-based report may be analyzed using an optical character recognition operation, or similar operation, to generate a text-based report, which may then be provided to the export preview viewer.

In some embodiments of the invention, the text-based report may be displayed within a display area, thereby allowing a user to view at least a portion of the report and assisting the user in selecting options for the export operation. Thus, the export preview viewer may allow a user to configure the export operation by providing various options for using page-position information and/or data type information within a report to determine how to export data to a spreadsheet application format. For example, a text-based report may include numerical data, text data, delimiters, headers, or other information, and the export preview viewer may export the data to a spreadsheet application according to various configuration options, such as a page range option, a parse method option, and/or additional options. The page range option may allow a user to specify which pages of a text-based report should be exported. The parse method option may allow a user to specify a method for using page-position information in the report to parse the information and export the information to a spreadsheet application. For example, a user may configure the parse method option to parse information in the report automatically, by fixed columns, by delimiters (e.g., commas, tabs, spaces, and/or other characters), or other techniques. The additional options may allow user to specify additional options or techniques for determining how to export a text-based report. For example, a user may configure the additional options to treat consecutive delimiters as one, filtering exported data by only including lines containing specific text, filtering exported data by excluding lines containing specific text, filtering exported data by excluding blank lines, or other techniques. Thus, after the user has provided criteria and selected an option to proceed with the export operation, the text-based report may be analyzed and delivered to a spreadsheet application (e.g., a spreadsheet application on a local machine) for the user to manipulate, analyze, and otherwise interact with.

Other objects and advantages of the invention will be apparent to those skilled in the art based on the following drawings and detailed description.

BRIEF DESCRIPTION OF THE DRAWINGS

FIG. 3 illustrates an exemplary data management application for accessing data in a data management system according to various embodiments of the invention.

FIG. 5 illustrates an exemplary output of data exported from a data management system according to various embodiments of the invention.

DETAILED DESCRIPTION

Figure 1:
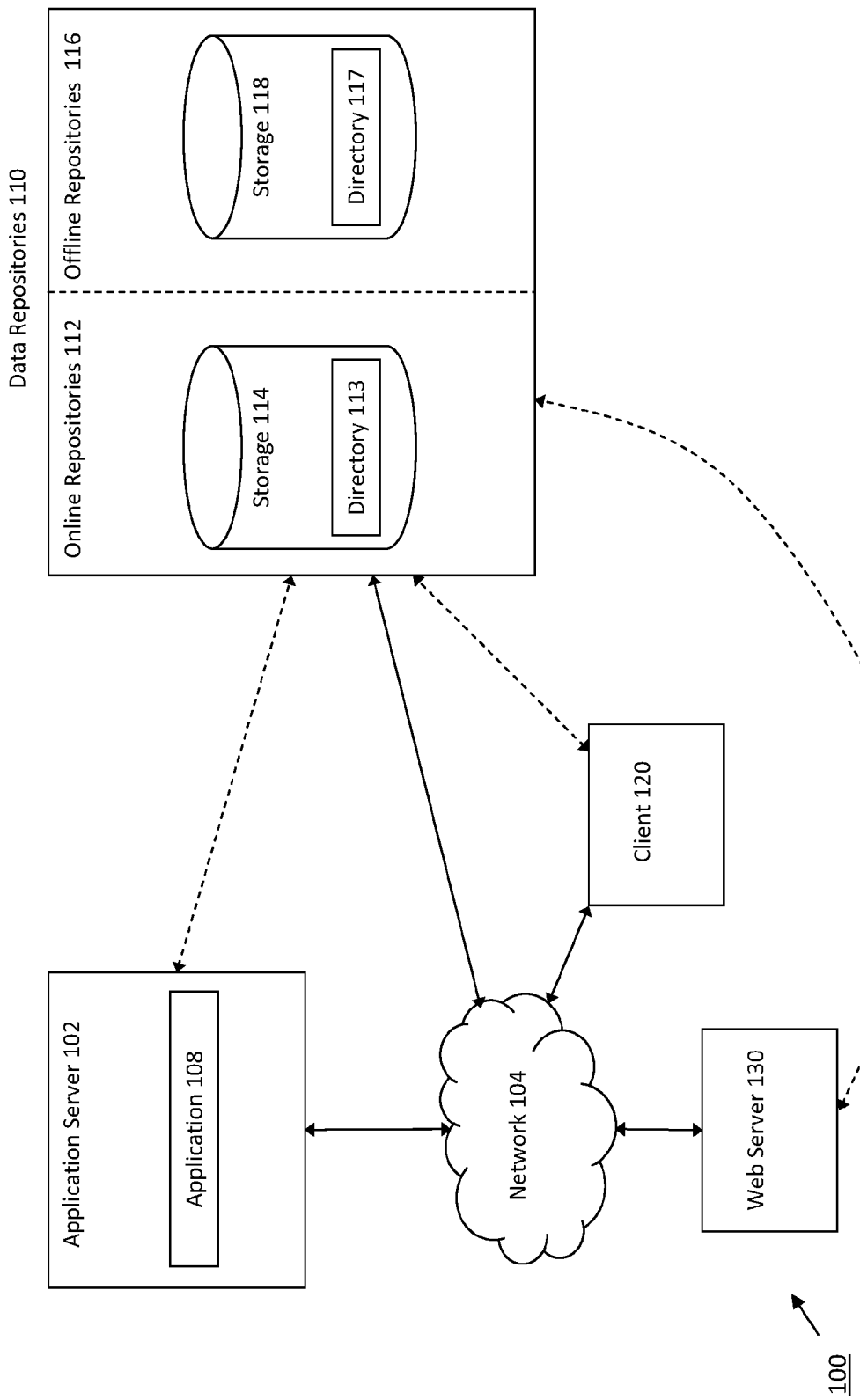
FIG. 1 illustrates an exemplary schematic diagram of a data management system according to various embodiments of the invention.

According to various embodiments of the invention, as shown in FIG. 1, a schematic diagram of an exemplary data management system 100 is provided for delivering results of search queries to end users. Data management system 100 may include, among other things, an application server 102 having a data management application 108 resident thereon. Application server 102 may use data management application 108 to perform one or more functions related to searching one or more data repositories 110, and data management application 108 may deliver formattable results of a search query to end users. Application server 102 and data management application 108 may include any suitable combination of hardware, software, and/or firmware operable to perform searching and/or formatting of data within data management system 100. In some aspects of operation, application server 102 may receive one or more search queries (e.g., via an input to a graphical user interface of data management application 108), and data management application 108 may search one or more data repositories 110, which may include online data repositories 112 and/or offline data repositories 116. When results matching the search query are identified, the results may be communicated to the data management application 108, and a user may view, export, and otherwise manipulate the results without disturbing versions of the results stored in the data repositories 110.

Application server 102, client device 120, and/or web server 130 may be coupled directly to data repositories 110 and/or indirectly via a network 104. As used herein, coupling may include any direct or indirect communication between two or more components, whether or not those components are physically connected. Moreover, as used herein, communication may be any communication between physically distinct components and/or communication between components within a single physical unit, or any suitable combination thereof. For example, application server 102, client device 120, and/or web server 130 may be communicatively coupled to data repositories 110 directly (e.g., via dashed lines in FIG. 1), and/or indirectly, via network 104 or other means. Client device 120 may be, for example, a desktop or notebook computer, a network terminal, a handheld device, or any other computing device capable of communicating with network 104. Thus, users may enter a search query at application server 102, client device 120, or in other ways, and the search may be executed against data repositories 110 directly, indirectly (e.g., via network 104, or via web server 130), or in other ways to deliver information matching the search query to the users.

Network 104 may be coupled to application server 102, client device 120, web server 130, and/or data repositories 110 to facilitate communication between components of system 100. For example, network 104 may support communications using Internet Protocol (IP) packets, frame relay frames, Asynchronous Transfer Mode (ATM) cells, or other suitable information between network addresses. Network 104 may include one or more local area networks (LANs), metropolitan area networks (MANs), campus networks, wide area networks (WANs), all or a portion of a global network (e.g., the Internet), or any other communication system or systems at one or more locations. Furthermore, data traffic on network 104 may be transmitted via wired, wireless, optical communications lines, a combination thereof, or other communication mediums.

Data repositories 110 may include online data repositories 112 and/or offline data repositories 116, where online data repositories 112 may include one or more online storage devices 114, and where offline data repositories 116 may include one or more offline storage devices 118. Data or other information stored or residing in online data repositories 112 and/or online storage devices 114 may generally be immediately available for retrieval. Offline data repositories 116 and/or offline storage devices 118 may include, for example, tape backup systems or optical disk arrays accessible by, and in communication with, various components of system 100. Data or other information in offline data repositories 116 may be compressed or stored in formats otherwise inaccessible without additional processing, or the data may be stored in a usual format that may be readily accessible once brought online. In certain circumstances, offline data repositories may include offline storage devices 118 such as backup devices, magnetic or optical disks or tapes, or other offline devices.

Data or other information resident in data repositories 110 may include, for example and among other things, reports such as revenue reports, sales reports, banking transactions, or other types of reports. Likewise, the data repositories 110 may contain data that can be compiled into customized and/or customizable reports by data management application 108 or another application in communication with, or residing on, network 104. Reports and reporting services are known to those skilled in the art, where data in a data repository may be accessed, analyzed, and presented in a predetermined format. For example, reports may be generated using Microsoft SQL Reporting Services, Crystal Reports®, or any other suitable reporting utility that would be known to those skilled in the art.

According to various embodiments of the invention, a search query may be received by data management application 108 or any other suitable input mechanism, where the search query may be a request to search for one or more reports matching predetermined criteria, user-provided criteria, or any combination thereof. The search query may include an online/offline criterion that indicates whether to search online data repositories 112, offline data repositories 116, and/or a combination thereof. The search query may be executed by identifying reports in online data repositories 112 and/or offline data repositories 116 (as specified in the online/offline criterion) match the search query. The identifying may be made by consulting one or more directory modules 113, 117, or another suitable mechanism for searching data repositories 110, 112, 116.

When one or more reports are identified that match the search query in the online data repositories 112, 114, the online reports may be delivered to a user that submitted the search query. When one or more reports are identified that match the search query in the offline data repositories 116, 118, the offline reports may be requested from the offline storage devices 118, retrieved and/or decompressed (if necessary), and delivered to the user that submitted the search query. In some embodiments, offline data repositories 116, 118 may include safeguards to ensure that the user wants to review the offline data. For example, when reports matching the search query are found in the offline data repositories 116, 118, the user may be prompted via a confirmation module, or other suitable mechanism, for confirmation that the user wants to proceed with retrieving offline data. Upon confirmation, a request may be sent to the offline data repositories 116 or devices 118, which can then respond to the request by unarchiving, decompressing, or otherwise making the offline data available. In some embodiments, an administrator or other user may modify a confirmation message, and may, for example, set data permissions or security to limit access to various data to certain users or classes of users.

When the online and/or offline reports matching the search query have been returned to the user, the reports may be provided in such a way as to protect information in data repositories 110 from being edited, modified, or otherwise overwritten. For example, the reports may be accessible to various users, and enterprise goals may require the reports be secured against tampering (e.g., due to a security breach) or accidental modification (e.g., by a user with valid access). Nonetheless, users may sometimes wish to analyze or otherwise manipulate information in the reports. Moreover, system 100 may also be configured to present reports in predetermined formats, whereas users may wish to represent the reports in other ways, or to interact with the reports using different applications or formats. Thus, system 100 may be configured to deliver reports to users in the predetermined formats, and data management application 108 (or other applications) may allow the user to export the reports to various formats and/or applications, as specified by the user, thereby allowing the user to manipulate information in the reports in a way that is most meaningful and optimal to user productivity. For example, an application for exporting and/or formatting reports may be implemented as shown in FIGS. 2-5 below.

Various changes may be made to system 100 without departing from the scope of the invention. For example, while FIG. 1 illustrates generally client-server implementations, other distributed or non-distributed implementations may be used. Also, while FIG. 1 illustrates certain software components as single components resident in a single processing unit, some or all of the software components can be divided into multiple modules, each performing one or more functions described. For example, though the application server 102 is shown as having a data management application 108 residing thereon, certain functions involved in the retrieval and display of report information, or processing thereof, may be shared between client device 120, web server 130, application server 102, other devices, and/or combinations thereof.

Figure 2:
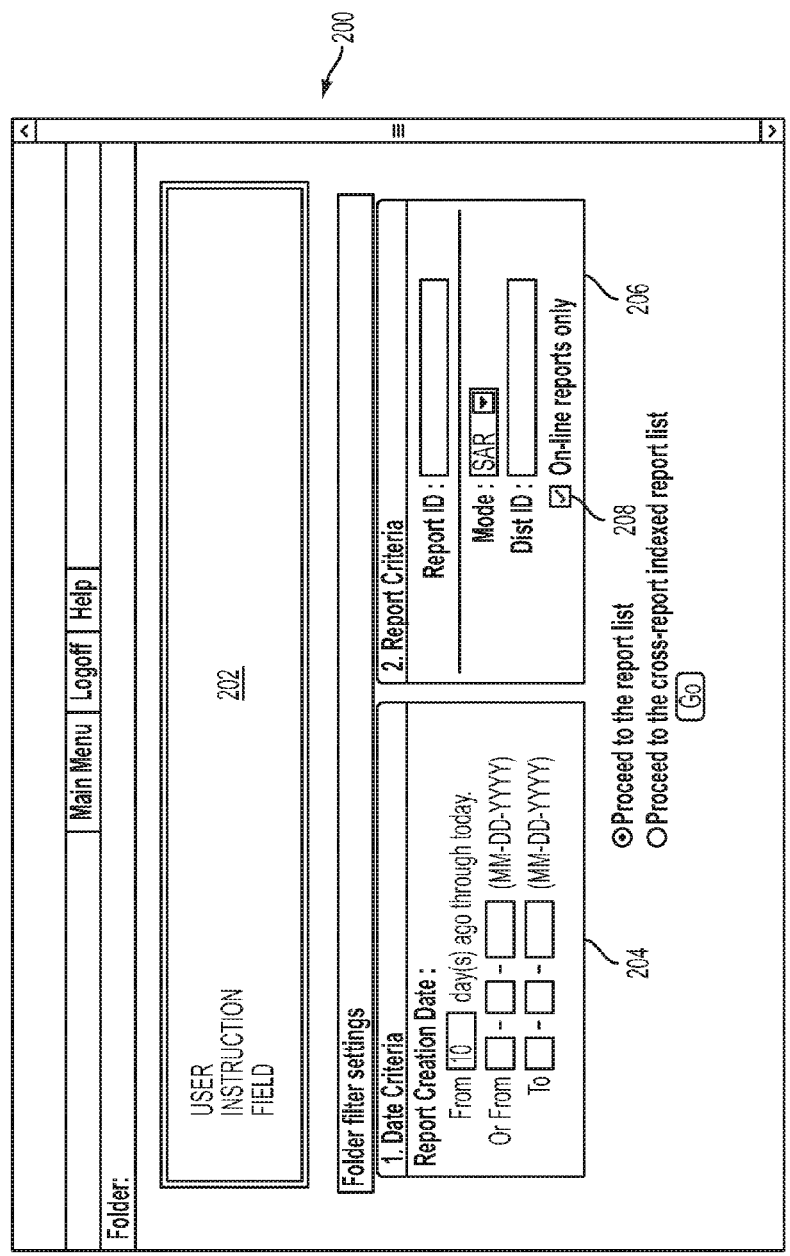
FIG. 2 illustrates an exemplary data management application for searching a data management system according to various embodiments of the invention.

According to various embodiments of the invention, as shown in FIG. 2, an exemplary data management application for searching reports in a data management system is provided. The data management application may present reports from one or more (online and/or offline) data repositories to end users in a desired format, while allowing the end users to manipulate the reports without editing, overwriting, corrupting, disturbing, or otherwise modifying the reports as they reside in the data repositories. In some implementations, the data management application may provide a web-based interface that extends functionality and features of mainframe repositories, thereby enabling users to make optimal, productive use of reports with minimal maintenance or training. For example, users may submit a search query via the data management application, one or more text-based reports matching the search query may be retrieved from one or more data repositories, and the data application may allow the users to export the matching reports in a familiar format (e.g., to a spreadsheet application residing on a local machine).

As shown in FIG. 2, the data management application may include a report filter utility 200. Report filter utility 200 may provide functions and features to search for reports. The data management application may be configured to track user activity using audit logging, vary a presentation of read versus unread reports, provide statistical analysis, make multiple versions of a report available, intelligently display report lists (e.g., by using sortable columns), and/or perform other functions. The data management application may be further configured to provide administrators, or similar types of users, with control over various features, such as enhancing scalability with a dynamic thread pool or specifying various system settings (e.g., default filters, threshold dates, etc.).

Users may specify various criteria to limit or target reports, in accordance with instructions 202. Instructions 202 may be configurable by an administrator, or similar type of user, to provide end users with direction as to how to formulate a search query. For example, in one implementation, instructions 202 may provide information telling a user how to specify filtering criteria via a date criteria field 204 and/or a report criteria field 206. The administrator may specify that one or more of date criteria field 204 and/or report criteria field 206 are mandatory (e.g., a user must specify date criteria and report criteria is optional, or some other combination), how to search for wildcards in various fields, or other information useful to formulating a search query. Filtering criteria 204 and/or 206 may be modified by an administrator in various ways, or additional filtering options may be provided, such that techniques for filtering and/or searching for reports may be responsive to unique needs of a particular business or enterprise.

For example, in some implementations, date search criteria 204 may include an option to search for reports according to a filtering range relative to a current day (i.e., a criteria of zero only includes reports created on the current day, a criteria of one includes reports created yesterday or on the current day, etc.). In some implementations, date search criteria 204 may include an option to search for reports according to a dynamically configurable range, where a user may enter a start date and a finish date, and all reports created within the start date and finish date (inclusive) may be searched for. In some implementations, report criteria 206 may include an option to search for reports having a specific identifier, and a user may search for reports having the specific identifier, or wildcards/truncation variables may be used, or other techniques for searching for reports based on an identifier may be used. In some implementations, options may be provided to control results of the search query (e.g., by specifying a view mode, a distribution list, or other action to be taken for the results of the search query). In some implementations, a user may specify whether to search online or offline repositories via an option 206. For example, a search may search both online and offline repositories by default and option 206 may allow the user to limit the search to online repositories only. In another example, option 206 may allow the user to limit the search according to various permutations, such as limiting the search to offline repositories, or an administrator may configure the default search to online repositories, or other configurations may be used. Once the user has specified filtering criteria for a report search query, the report search query may be executed against the data repositories.

According to various embodiments of the invention, as shown in FIG. 3, an exemplary data management application for accessing data in a data management system is provided. The data management application may include a report list viewer 300, which displays a list of reports identified in the data repositories as matching the search query. Report list viewer 300 may be displayed in a graphical user interface, and may include columns displaying available actions (i.e., column 303), identifiers, creation dates, creation times, descriptions, or other information for each report. In some implementations, one or more of the columns may be sortable (i.e., a user may click on a column header to sort the report list according to criteria in the column). The reports shown in report list viewer 300 may be limited to current versions of each report, thereby limiting a number of search query results. However, an option may also be provided for a user to request display of older versions of a report.

In some implementations, report list viewer 300 may be displayed in the graphical user interface together with report filter utility 200 (as described in FIG. 2). Thus, a user may optionally provide additional filtering criteria, such as when report list viewer 300 includes more, less, or different results than desired or expected. For example, a user may narrow a specified date range to reduce a number of search results, or the user may broaden the specified date range to augment a number of search results, or the search results may be further modified by changing filtering criteria within report filter utility 200.

Action column 303 may include a pull-down menu (or other graphical selection object) allowing a user to quickly take action on a report. For example, an option 304 may allow the user to browse a report, an option 308 may allow the user to view to annotations associated with the report, an option 309 may allow the user to email the report, an option 310 may allow the user to export the report (described in greater detail below), or other options may be provided allowing the user to take various actions. In various implementations, an appearance of one or more of options in action column 303 may be varied to provide quick indication of which actions have been previously taken, the appearance of one or more options may be varied when the option is unavailable for a particular report (e.g., the option may be grayed out), and/or the appearance of all action options may be reset when a user selects an option to set indicator statuses.

Figure 4:
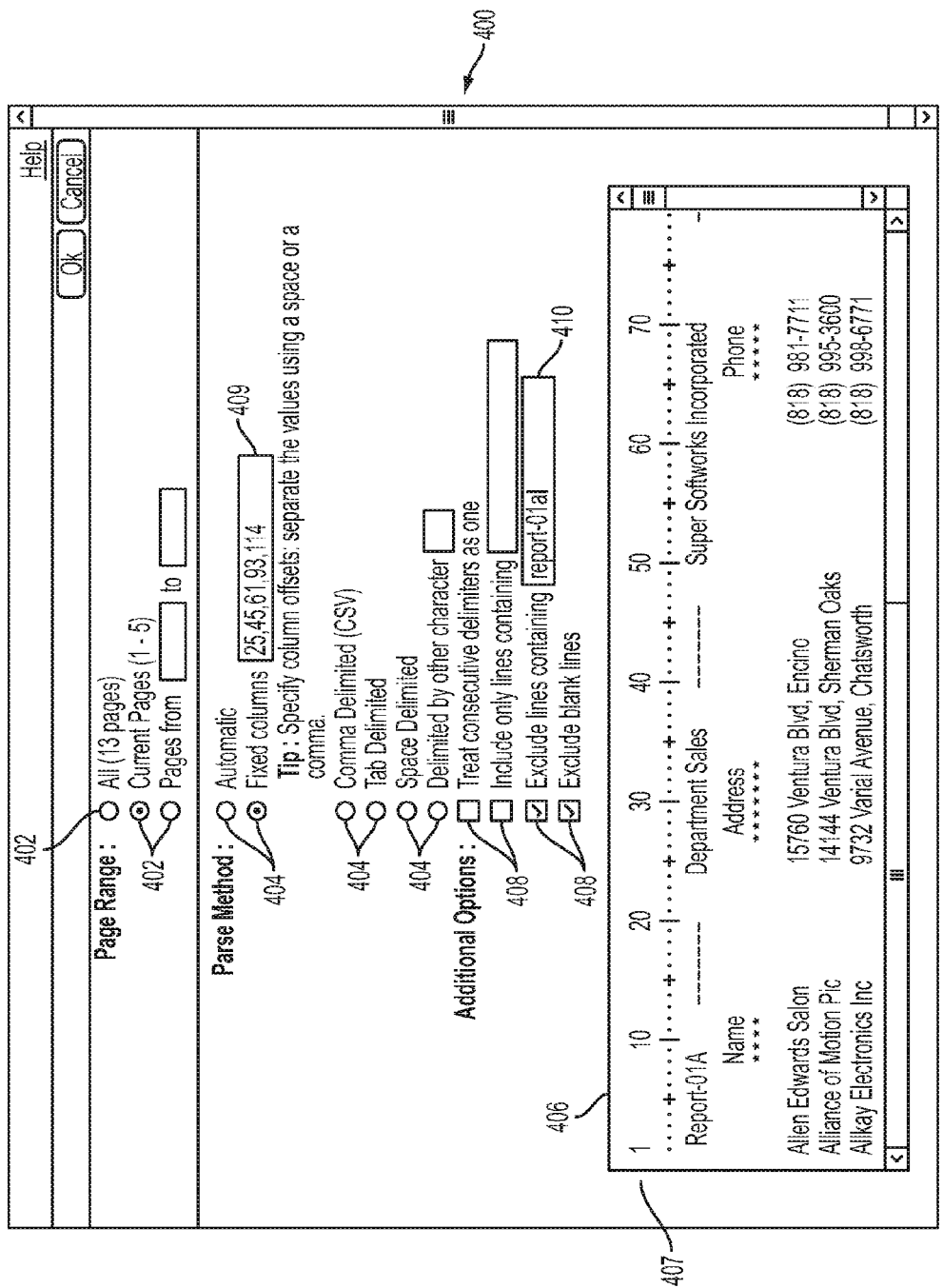
FIG. 4 illustrates an exemplary data management application for exporting data from a data management system according to various embodiments of the invention.

According to various embodiments of the invention, as shown in FIG. 4, an exemplary data management application for exporting data from a data management system is provided. The data management application may include an export preview viewer 400, which may display a set of fields for configuring an export operation. Export preview viewer 400 may be displayed when a user selects an export option 310 (as shown in FIG. 3) for a selected report, and may include options for reconfiguring or reformatting a report so as to be easily accessible for review and analysis. In particular, a text-based report including, for example, sales figures, may be persistently stored in online and/or offline data repositories, and by selecting export option 310, the text-based report may be exported for a user to manipulate and analyze, thereby protecting an original version of the text-based report in the data repositories. Moreover, export option 310 may provide options for configuring the export operation, such that a user may make optimal productive use of information in the text-based report by customizing the information therein to a form useable within a spreadsheet application, where the user can manipulate the information and customize an organization of the information.

When the selected report is an online report (i.e., stored in an online storage device within online data repositories), export preview viewer 400 may be displayed without any further user action. When the selected report is an offline report (i.e., stored in an offline storage device within offline data repositories), a user may be prompted to provide a confirmation that the offline report is to be recalled from offline storage before displaying export preview viewer 400. For example, after selecting an offline report, a proceed message may be displayed and a user may be prompted to confirm whether to proceed with recalling the offline report. When the user elects to proceed, a confirmation message may display a confirmation that the offline report is being recalled, and a request may be sent to a host offline data repository to retrieve the report. In one implementation, the proceed message and/or the confirmation message may be customized by an administrator, or similar type of user. For example, the proceed message may display information indicating an offline report is unavailable, an expected amount of time needed to recall an offline report, a prompt as to whether to proceed with recalling the report, or other information, and the confirmation message may display information indicating that a request has been submitted to an offline data repository, an expected amount of time before the report will be available, an elapsed time or other status of the recall request, or other information. Those skilled in the art will appreciate that the proceed message and/or confirmation message may be varied in many ways to meet the needs of a particular implementation.

After a selected report has been retrieved (from online and/or offline data repositories, as described above), export preview viewer 400 may be displayed, providing one or more options for configuring a process of exporting a text-based report to a spreadsheet application. When a report is in an image format (e.g., a Portable Document Format, or other image format), the image-based report may be analyzed using an optical character recognition operation, or similar operation, to generate a text-based report, which may then be provided to export preview viewer 400.

The text-based report may be displayed within a display area 406, thereby allowing a user to view at least a portion of the report and assisting the user in selecting options for the export operation. For example, display area 406 may include a column offset 407 that shows column positions for text within display area 406. Thus, export preview viewer 400 may allow a user to configure the export operation by providing various options for using page-position information and/or data type information within a report to determine how to export data to a spreadsheet application format. For example, a text-based report may include numerical data, text data, delimiters, headers, or other information, and export preview viewer 400 may export the data to a spreadsheet application according to various configuration options, such as a page range option 402, a parse method option 404, and/or additional options 408.

Page range option 402 may include one or more radio buttons (or other graphical selection objects) for allowing a user to specify which pages of a text-based report should be exported. For example, a user may configure page range option 402 to export all pages, current pages, a specific page or page range, or other page variations of the text-based report. Thus, when a user elects to export the text-based report, which pages of the text-based report are exported may be limited according to formatting preferences specified by page range option 402.

Parse method option 404 may include one or more radio buttons (or other graphical selection objects) for allowing a user to specify a method for using page-position information in the report to parse the information and export the information to a spreadsheet application. For example, a user may configure parse method option 404 to parse information in the report automatically, by fixed columns, by delimiters (e.g., commas, tabs, spaces, and/or other characters), or other techniques. In one example, parse method option 404 may be configured to parse information in a text-based report automatically, where an export operation may include identifying patterns in the text to determine how information is organized and a best-guess may parse the text accordingly (e.g., by identifying character strings, numerical values, combinations thereof, etc., and deriving a parse method). In another example, as shown in FIG. 4, parse method option 404 may be configured to parse information in a text-based report according to user-specified fixed columns 405 (e.g., a column may be delimited at column widths of 25, 45, 61. 93, 114, etc.). As shown in FIG. 4, the text-based report shown in display area 406 has columns for a Name, an Address, a City, a Phone number, Year to Date Sales, Department, etc. By viewing text in display area 406, a user may identify a column offset 407 for the various columns, where Names occur within a column offset of 0-25, Addresses occur within a column offset of 26-45. Cities occur within a column offset of 46-61, Phone numbers occur within a column offset of 62-93, Year to Date Sales occur within a column offset of 94-114, Departments occur within a column offset of 114+, etc. In another example, parse method option 404 may be configured to parse information in the text-based report according to a delimiter, where text in the report may be delimited by commas, tabs, spaces, or other characters, where delimiters (e.g., comma-separated-variables (CSV)) and similar techniques are well-known to those skilled in the art. Thus, when a user elects to export the text-based report, how the text-based report is exported into columns within a spreadsheet application may be configured according to formatting preferences specified by parse method option 402.

Additional options 408 may include one or more check-boxes (or other graphical selection objects) for allowing a user to specify additional options or techniques for determining how to export a text-based report. For example, a user may configure additional options 408 to treat consecutive delimiters as one, filter exported data by only including lines containing specific text, filter exported data by excluding lines containing specific text, filter exported data by excluding blank lines, or other techniques. In one example, consecutive delimiters may be treated as one to reduce exporting errors when additional delimiters are accidentally included (e.g., a CSV file having delimited text appearing as "NAME, ADDRESS, CITY" or "NAME, ADDRESS, CITY" may both be delimited into columns of "NAME" "ADDRESS" and "CITY"). In another example, exported data may be filtered by only including lines containing specific text, such that a user may filter an amount of exported information to that which is actually needed. For example, a user may only desire to analyze or manipulate information for individuals in an "(818)" area code, such that the user may limit exported data by selecting a check-box (or other graphical selection object) and entering "(818)" into a corresponding text-box. In another example, as shown in FIG. 4, exported data may be filtered by excluding lines containing specified text, such as when a text-based report contains header information or other information that is not necessary for analysis. Thus, a user may select a check-box (or other graphical selection object), and enter a string of text identifying one or more lines to exclude from an exporting operation. For example, in FIG. 4, a first line of text shown in display area 406 contains header information that may not necessarily be useful to a user exporting the report, and the user may enter "report-01a" to exclude that line of text. Similarly, blank lines may generally be useful in text-based reports by enhancing an appearance of the text, yet blank lines may not necessarily provide any benefit within a spreadsheet application. Thus, a user may select a check-box (or other graphical selection object) to exclude blank lines of text. Those skilled in the art will appreciate that other options may be provided, or various options may be combined, to provide users with various options in determining how to export data.

According to various embodiments of the invention, as shown in FIG. 5, an exemplary output of exported data using techniques described above is provided. For example, as shown in FIG. 4, a user may configure an export operation for a selected report by exporting data according to a current page range (e.g., pages 1-5), user-specified fixed columns (e.g., column offset 0-25 contains Names, column offset 26-45 contains Addresses, column offset 46-61 contains Cities, column offset 62-93 contains Phone numbers, column offset 94-114 contains Year to Date Sales, column offset 114+ contains Departments, etc), excluding lines containing user-specified text (e.g., "report-01a"), and/or excluding blank lines. Thus, after the user has provided criteria and selected an option to proceed with the export operation, the text-based report may be analyzed and delivered to a spreadsheet application (e.g., a spreadsheet application on a local machine) for the user to manipulate, analyze, and otherwise interact with. FIG. 5 illustrates a spreadsheet output 500 according to user selections illustrated in FIG. 4 and described above, where spreadsheet output 500 includes columns (e.g., A-F) and rows (e.g., 1-10) created according to the user selections.

The above disclosure has been described in terms of specific exemplary aspects, implementations, and embodiments of the invention. However, those skilled in the art will recognize various changes and modifications that may be made without departing from the scope and spirit of the invention. Therefore, the specification and drawings are to be regarded as exemplary only, and the scope of the invention is to be determined solely by the appended claims.

What is claimed is:

1. A computer-implemented method for delivering search results that include data from one or more online data repositories that store a plurality of online reports and one or more offline data repositories that store a plurality of archived or compressed reports in a long-term backup system, comprising:

setting security to limit access to the plurality of online reports stored in the online data repositories and the plurality of archived or compressed reports stored in the offline data repositories;

specifying one or more mandatory criteria fields and one or more optional criteria fields to search the online data repositories and the offline data repositories;

searching, by a processor, the plurality of online reports stored in the online data repositories to identify a first report among the plurality of online reports stored in the online data repositories that matches criteria provided in a search query in response to a data management application determining that the criteria provided in the search query includes at least the one or more mandatory criteria fields;

searching, by the processor, the plurality of archived or compressed reports stored in the long-term backup system associated with the offline data repositories to identify a second report among the plurality of archived or compressed reports stored in the offline data repositories that matches the criteria provided in the search query in response to the data management application determining that the criteria provided in the search query includes at least the one or more mandatory criteria fields;

exporting data from the first report identified in the online data repositories in accordance with one or more export options provided for the first report;

exporting data from the second report identified in the offline data repositories in accordance with one or more export options provided for the second report, wherein exporting the data from the second report includes unarchiving or decompressing the second report identified among the plurality of archived or compressed reports stored in the offline data repositories;

analyzing the data exported from the first report and the data exported from the second report;

delivering, by a data management application, the analyzed data exported from the first report and the analyzed data exported from the second report to a spreadsheet application in response to a user that submitted the search query having one or more permissions that satisfy the security, wherein manipulating the data delivered to the spreadsheet application does not modify the first report stored in the online data repositories or the second report stored in the long-term backup system associated with the offline data repositories; and tracking activity associated with the user interacting with the analyzed data delivered to the spreadsheet application to generate an audit log, vary a presentation associated with the first report or the second report depending on read versus unread status, and generate statistical analysis relating to the tracked activity.

2. The method of claim 1, further comprising:
determining that at least one of the first report or the second report is an image-based report; and
converting the at least one image-based report into a text-based report using optical character recognition.

3. The method of claim 1, wherein the export options provided for one or more of the first report or the second report include a parsing criteria indicating one or more pages in the respective report having the data to be exported.

4. The method of claim 1, wherein the export options provided for one or more of the first report or the second report include an automatic parsing criteria indicating at least one of a delimiter, a column offset, or a data type used to organize information in the respective report and export the data from the respective report.

5. The method of claim 1, wherein the export options provided for one or more of the first report or the second report include at least one column offset value used to organize information in the respective report and export the data from the respective report.

6. The method of claim 1, wherein the export options provided for one or more of the first report or the second report include at least one delimiter character used to organize information in the respective report and export the data from the respective report.

7. The method of claim 6, wherein exporting the data from the first report or the second report further includes treating two or more consecutive occurrences of the delimiter character as one occurrence of the delimiter character in response to the export options including a selection to treat consecutive delimiters as one.

8. The method of claim 1, wherein the data exported from the first report or the second report includes data from any line in the respective report having an inclusion filtering criteria provided in the export options associated with the respective report and excludes data from any line in the respective report having an exclusion filtering criteria provided in the export options associated with the respective report.

9. The method of claim 1, wherein the criteria provided in the search query indicates whether to search only the online data repositories, only the offline data repositories, or both the online data repositories and offline data repositories, and wherein the method further comprises recalling the second report from the long-term backup system associated with the offline data repositories in response to a selection of the second report that matches the criteria provided in the search query.

10. A computer-readable storage medium having computer-executable instructions recorded thereon for delivering search results that include data from one or more online data repositories that store a plurality of online reports and one or more offline data repositories that store a plurality of archived or compressed reports in a long-term backup system, the computer-executable instructions operable when executed on a computer to:

set security to limit access to the plurality of online reports stored in the online data repositories and the plurality of archived or compressed reports stored in the offline data repositories;

specify one or more mandatory criteria fields and one or more optional criteria fields to search the online data repositories and the offline data repositories;

search, by a processor, the plurality of online reports stored in the online data repositories to a first report among the plurality of online reports stored in the online data repositories that matches criteria provided in a search query in response to the criteria provided in the search query including at least the one or more mandatory criteria fields;

search, by the processor, the plurality of archived or compressed reports stored in the long-term backup system associated with the offline data repositories to identify a second report among the plurality of archived or compressed reports stored in the offline data repositories that matches the criteria provided in the search query in response to the criteria provided in the search query including at least the one or more mandatory criteria fields;

export data from the first report identified in the online data repositories in accordance with one or more export options provided for the first report;

export data from the second report stored in the offline data repositories in accordance with one or more export options provided for the second report, wherein the computer-executable instructions are further operable to unarchive or decompress the second report identified among the plurality of archived or compressed reports stored in the offline data repositories to export the data from the second report;

analyze the data exported from the first report and the data exported from the second report;

deliver the analyzed data exported from the first report and the analyzed data exported from the second report to a spreadsheet application in response to a user that submitted the search query having one or more permissions that satisfy the security, wherein manipulating the data delivered to the spreadsheet application does not modify the first report stored in the online data repositories or the second report stored in the long-term backup system associated with the offline data repositories; and track activity associated with the user interacting with the analyzed data delivered to the spreadsheet application to generate an audit log, vary a presentation associated with the first report or the second report depending on read versus unread status, and generate statistical analysis relating to the tracked activity.

11. The computer-readable storage medium of claim 10, the computer-executable instructions further operable when executed to:
determine that at least one of the first report or the second report is an image-based report; and
convert the at least one image-based report into a text-based report using the optical character recognition.

12. The computer-readable storage medium of claim 10, wherein the export options provided for one or more of the first report or the second report include a parsing criteria indicating one or more pages in the respective report having the data to be exported.

13. The computer-readable storage medium of claim 10, wherein the export options provided for one or more of the first report or the second report include an automatic parsing criteria indicating at least one of a delimiter, a column offset, or a data type used to organize information in the respective report and export the data from the respective report.

14. The computer-readable storage medium of claim 10, wherein the export options provided for one or more of the first report or the second report include at least one column offset value used to organize information in the respective report and export the data from the respective report.

15. The computer-readable storage medium of claim 10, wherein the export options provided for one or more of the first report or the second report include at least one delimiter character used to organize information in the respective report and export the data from the respective report.

16. The computer-readable storage medium of claim 15, wherein the computer-executable instructions are further operable to treat two or more consecutive occurrences of the delimiter character as one occurrence of the delimiter character to export the data from the first report or the second report in response to the export options including a selection to treat consecutive delimiters as one.

17. The computer-readable storage medium of claim 10, wherein the data exported from the first report or the second report includes data from any line in the respective report having an inclusion filtering criteria provided in the export options associated with the respective report and excludes data from any line in the respective report having an exclusion filtering criteria provided in the export options associated with the respective report.

18. The computer-readable storage medium of claim 10, wherein the criteria provided in the search query indicates whether to search only the online data repositories, only the offline data repositories, or both the online data repositories and offline data repositories, and wherein the computer-executable instructions are further operable when executed to recall the second report from the long-term backup system associated with stored in the offline data repositories in response to a selection of the second report that matches the criteria provided in the search query.

19. A system for delivering search results, comprising:
one or more online data repositories configured to store a plurality of online reports;
a long-term backup facility having one or more offline data repositories configured to store a plurality of archived or compressed reports;
a data management application configured to:
set security to limit access to the reports stored in the online data repositories and the plurality of archived or compressed reports stored in the offline data repositories; and
specify one or more mandatory criteria fields and one or more optional criteria fields to search the online data repositories and the offline data repositories; and
one or more processors configured to:
receive a search query from a client device;
search the plurality of online reports stored in the online data repositories to identify a first report among the plurality of online reports stored in the online data repositories that matches criteria provided in the search query in response to the criteria provided in the search query including at least the one or more mandatory criteria fields;
search the plurality of archived or compressed reports in the long-term backup facility associated with the offline data repositories to identify a second report among the plurality of archived or compressed reports stored in the offline data repositories that matches the criteria provided in the search query in response to the criteria provided in the search query including at least the one or more mandatory criteria fields;
export data from the first report identified in the online data repositories in accordance with one or more export options provided for the first report;
export data from the second report stored in the offline data repositories in accordance with one or more export options provided for the second report, wherein the one or more processors are further configured to unarchive or decompress the second report identified among the plurality of archived or compressed reports stored in the offline data repositories to export the data from the second report;
analyze the data exported from the first report and the data exported from the second report;
deliver the analyzed data exported from the first report and the analyzed data exported from the second report to a spreadsheet application associated with the client device in response to the data management application determining that a user that submitted the search query has one or more permissions that satisfy the security, wherein manipulating the data delivered to the spreadsheet application on the client device does not modify the first report stored in the online data repositories or the second report stored in the offline data repositories, and wherein the data management application is further configured to track activity associated with the user interacting with the analyzed data delivered to the spreadsheet application to generate an audit log, vary a presentation associated with the first report or the second report depending on read versus unread status, and generate statistical analysis relating to the tracked activity.

20. The system of claim 19, the one or more processors further configured to:
determine that at least one of the first report or the second report is an image-based report; and
convert the at least one image-based report into a text-based report using the optical character recognition.

21. The system of claim 19, wherein the export options provided for one or more of the first report or the second report include a parsing criteria indicating one or more pages in the respective report having the data to be exported.

22. The system of claim 19, wherein the export options provided for one or more of the first report or the second report include an automatic parsing criteria indicating at least one of a delimiter, a column offset, or a data type used to organize information in the respective report and export the data from the respective report.

23. The system of claim 19, wherein the export options provided for one or more of the first report or the second report include at least one column offset value used to organize information in the respective report and export the data from the respective report.

24. The system of claim 19, wherein the export options provided for one or more of the first report or the second report include at least one delimiter character used to organize information in the respective report and export the data from the respective report.

25. The system of claim 24, wherein the one or more processors are further configured to treat two or more consecutive occurrences of the delimiter character as one occurrence of the delimiter character to export the data from the first report or the second report in response to the export options including a selection to treat consecutive delimiters as one.

26. The system of claim 19, wherein the data exported from the first report or the second report includes data from any line in the respective report having an inclusion filtering criteria provided in the export options associated with the respective report and excludes data from any line in the respective report having an exclusion filtering criteria provided in the export options associated with the respective report.

27. The system of claim 19, wherein the criteria provided in the search query indicates whether to search only the online data repositories, only the offline data repositories, or both the online data repositories and offline data repositories, and wherein the one or more processors are further configured to recall the second report from the long-term backup facility associated with the offline data repositories in response to a selection of the second report that matches the criteria provided in the search query.

28. The method of claim 9, further comprising displaying a proceed message in response to the selection of the second report stored in the long-term backup system associated with the offline data repositories, wherein the proceed message includes an availability of the second report stored in the long-term backup system, an amount of time needed to recall the second report from the long-term backup system, and a prompt to confirm that the second report is to be recalled from the long-term backup system.

29. The method of claim 28, further comprising displaying a confirmation message in response to receiving a confirmation to the prompt in the proceed message, wherein the confirmation message includes a confirmation that a request to recall the second report has been submitted to the long-term backup system, an expected amount of time until the second report will be recalled from the long-term backup system, and an elapsed time since the request to recall the second report was submitted to the long-term backup system.

30. The computer-readable storage medium of claim 18, the computer-executable instructions further operable when executed to display a proceed message in response to the selection of the second report stored in the long-term backup system associated with the offline data repositories, wherein the proceed message includes an availability of the second report stored in the long-term backup system, an amount of time needed to recall the second report from the long-term backup system, and a prompt to confirm that the second report is to be recalled from the long-term backup system.

31. The computer-readable storage medium of claim 30, the computer-executable instructions further operable when executed to display a confirmation message in response to receiving a confirmation to the prompt in the proceed message, wherein the confirmation message includes a confirmation that a request to recall the second report has been submitted to the long-term backup system, an expected amount of time until the second report will be recalled from the long-term backup system, and an elapsed time since the request to recall the second report was submitted to the long-term backup system.

32. The system of claim 27, the one or more processors further configured to display a proceed message in response to the selection of the second report stored in the long-term backup facility associated with the offline data repositories, wherein the proceed message includes an availability of the second report stored in the long-term backup facility, an amount of time needed to recall the second report from the long-term backup facility, and a prompt to confirm that the second report is to be recalled from the long-term backup facility.

33. The system of claim 32, the one or more processors further configured to display a confirmation message in response to receiving a confirmation to the prompt in the proceed message, wherein the confirmation message includes a confirmation that a request to recall the second report has been submitted to the long-term backup facility, an expected amount of time until the second report will be recalled from the long-term backup facility, and an elapsed time since the request to recall the second report was submitted to the long-term backup facility.

34. The system of claim 27, further comprising a dynamic thread pool, wherein the one or more processors are configured to use one or more threads in the dynamic thread pool to recall the second report from the long-term backup facility associated with the offline data repositories and provide scalability in recalling information from the long-term backup facility.

35. The computer-readable storage medium of claim 18, wherein the computer-executable instructions are further operable when executed to use one or more threads in a dynamic thread pool to recall the second report from the long-term backup system associated with the offline data repositories and provide scalability in recalling information from the long-term backup system.

36. The method of claim 9, wherein one or more threads in a dynamic thread pool recall the second report from the long-term backup system associated with the offline data repositories to enable scalability in recalling information from the long-term backup system.

\* \* \* \* \*